(12) United States Patent
Jung et al.

(10) Patent No.: US 9,731,639 B2
(45) Date of Patent: Aug. 15, 2017

(54) VEHICLE SEAT PROVIDED WITH CHANNEL

(71) Applicant: KBAUTOTECH CO., LTD., Chungcheongnam-do (KR)

(72) Inventors: Dal Young Jung, Gyeonggi-do (KR); Young Sun Kim, Chungcheongnam-do (KR)

(73) Assignee: KBAUTOTECH CO., LTD. (KR)

( * ) Notice: Subject to any disclaimer, the term of this patent is extended or adjusted under 35 U.S.C. 154(b) by 136 days.

(21) Appl. No.: 14/758,554

(22) PCT Filed: Dec. 30, 2013

(86) PCT No.: PCT/KR2013/012399
§ 371 (c)(1),
(2) Date: Jun. 29, 2015

(87) PCT Pub. No.: WO2014/104859
PCT Pub. Date: Jul. 3, 2014

(65) Prior Publication Data
US 2016/0001686 A1    Jan. 7, 2016

(30) Foreign Application Priority Data

Dec. 31, 2012  (KR) .......................... 10-2012-0158754
Dec. 30, 2013  (KR) .......................... 10-2013-0167771

(51) Int. Cl.
*B60N 2/56*  (2006.01)
*B60N 2/68*  (2006.01)

(52) U.S. Cl.
CPC ......... *B60N 2/5657* (2013.01); *B60N 2/5635* (2013.01); *B60N 2/5685* (2013.01); *B60N 2/68* (2013.01)

(58) Field of Classification Search
CPC .. B60N 2/5657; B60N 2/5635; B60N 2/5685; B60N 2/68
(Continued)

(56) References Cited

U.S. PATENT DOCUMENTS

| 6,179,706 | B1 * | 1/2001 | Yoshinori | ............ B60N 2/5635 |
| | | | | 297/180.14 X |
| 7,201,441 | B2 * | 4/2007 | Stoewe | ................ B60N 2/5657 |
| | | | | 297/180.14 |

(Continued)

FOREIGN PATENT DOCUMENTS

| DE | 102008022628 A1 * | 11/2009 |
| JP | 05277020 | 9/1993 |

(Continued)

OTHER PUBLICATIONS

International Search Report and Written Opinion for Application No. PCT/KR2013/012399 dated Mar. 26, 2014 (2 pages).

(Continued)

*Primary Examiner* — Anthony D Barfield
(74) *Attorney, Agent, or Firm* — Michael Best & Friedrich LLP (57) ABSTRACT

A vehicle seat is provided with a channel, and includes a seat part provided with a channel formed on the lower surface thereof, wherein the channel is in communication with a seat surface; a back part connected to the seat part; a ventilation flow channel connected to at least the seat part and which is in communication with the channel; and a blower fan arranged in the ventilation flow channel. The vehicle seat is provided with a channel, and is configured such that the channel is formed on the lower surface of the seat part, thus preventing the deformation of the channel, maintaining a ventilation pathway to be intact even when a passenger is (Continued)

sitting on the seat for a long period of time, and enabling the passenger to constantly feel comfortable in the seat part.

12 Claims, 8 Drawing Sheets

(58) Field of Classification Search
USPC .................................................. 297/180.14
See application file for complete search history.

(56) References Cited

U.S. PATENT DOCUMENTS

| | | | | |
|---|---|---|---|---|
| 7,857,395 | B2* | 12/2010 | Kikuchi | B60R 11/0264 |
| | | | | 297/180.14 X |
| 2003/0102699 | A1* | 6/2003 | Aoki | B60H 1/00285 |
| | | | | 297/180.14 |
| 2009/0031742 | A1* | 2/2009 | Seo | B60N 2/5657 |
| | | | | 297/180.14 |

FOREIGN PATENT DOCUMENTS

| | | |
|---|---|---|
| JP | 2009077760 | 4/2009 |
| JP | 2010000273 | 1/2010 |
| JP | 2011201506 | 10/2011 |
| KR | 10-2008-0048911 | 6/2008 |
| KR | 10-2013-0027107 | 3/2013 |

OTHER PUBLICATIONS

Korean Patent Office Action for Application No. 10-2013-0167771 dated Nov. 24, 2014 (4 pages).
Korean Patent Office Decision of Grant for Application No. 10-2013-0167771 dated Apr. 30, 2015 (5 pages).

\* cited by examiner

VEHICLE SEAT PROVIDED WITH CHANNEL

TECHNICAL PROBLEM

The present invention relates to a vehicle seat provided with a channel, and more particularly, to a vehicle seat with a channel in which the channel is provided on a lower surface of a seat part to provide comfort of a passenger and not to deform a ventilation pathway even when the passenger is seated for a long time.

BACKGROUND

Many vehicle seats are designed to be able to flow air to the outside of a seat for comfort of a passenger. To this end, ventilation flow channels and blower fans are provided in the vehicle seats, and an H-channel is provided in each seat part to discharge air blown by the blower fan to the outside of the seat.

Figure 1:
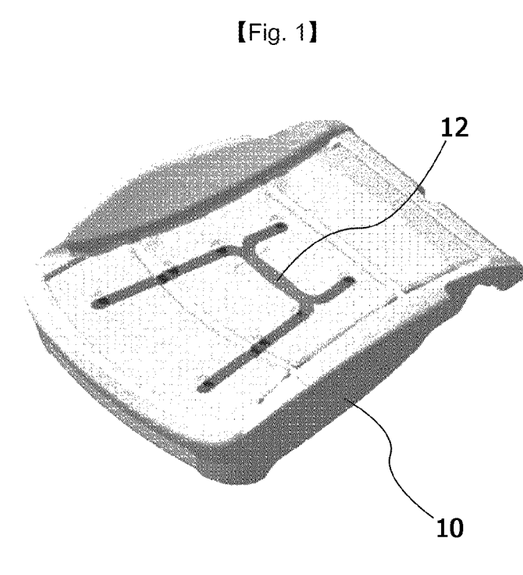
FIG. 1 is a perspective view illustrating an aspect in which a channel is exposed on a seat surface of a general vehicle seat.

FIG. 1 is a perspective view illustrating an aspect in which an H-channel 12 is exposed on a seat surface of a general vehicle seat.

As shown in FIG. 1, a seat part 10 of the general vehicle seat has a seat surface being in contact with the lower half of the body of a passenger, and the H-channel 12 for discharging air flowing is formed on the seat surface.

Figure 2:
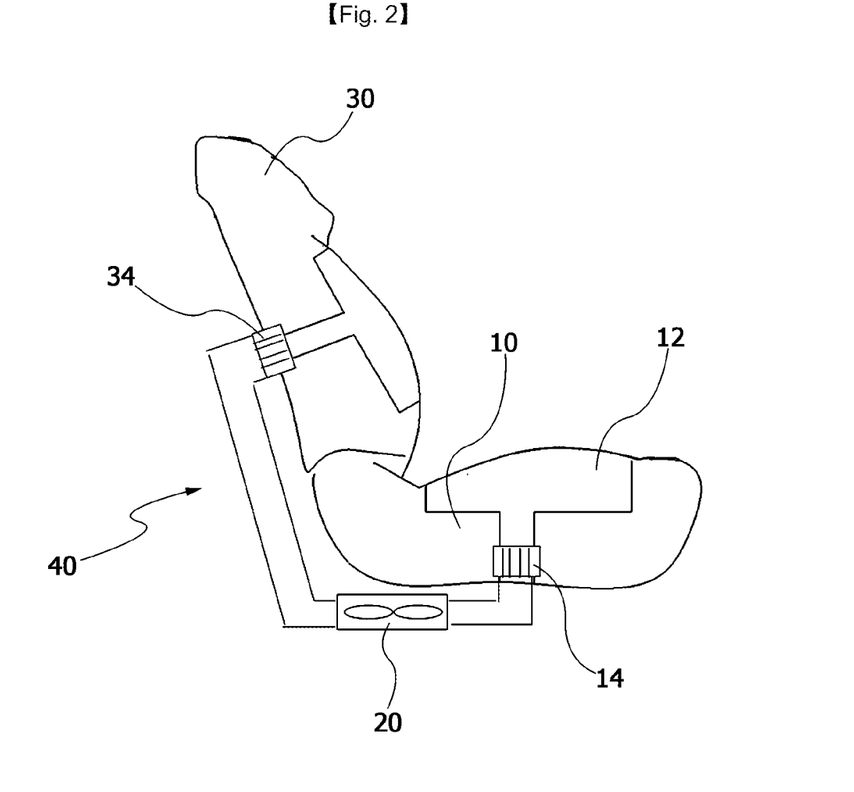
FIG. 2 is a cross-sectional view illustrating an internal structure of the general vehicle seat.

Further, FIG. 2 is a cross-sectional view illustrating an internal structure of the general vehicle seat.

As shown in FIG. 2, a vehicle seat includes a seat part 10 and a back part 30, and a blower fan 20 provided at a ventilation flow channel 40 provided at the rear of the vehicle seat discharges air to the outside of the vehicle seat through an H-channel 12. Here, positive temperature coefficients (PTCs) 14 and 34 may be provided at connection portions where the ventilation flow channel 40 is connected to the seat part 10 and back part 30.

Since the general vehicle seat has the H-channel 12 on the seat surface being in contact with the body of a passenger, the H-channel 12 can be easily deformed when the passenger sits for a long time or the passenger has a heavy weight. Accordingly, it causes a problem in which a ventilation pathway is deformed and an original function thereof may not be performed.

Further, the hardness of a pad of the seat part 10 is weakened by the H-channel 12 itself, and thus, there is also a problem to drop the comfort of the passenger.

Therefore, methods to overcome the above problems are required.

SUMMARY

Technical Problem

The objectives of a vehicle seat provided with a channel according to the present invention are below.

First, the present invention is directed to providing that a ventilation pathway has to be maintained without any deformation even when a passenger sits for a long time.

Second, the present invention is directed to preventing a phenomenon in which seat comfort drops.

Third, the present invention is directed to preventing resistance of air flowing from occurring due to blockage of connection flow channels.

The objectives of the present invention are not limited to the above, and other objectives will be clearly understood to those skilled in the art from the following description.

Technical Solution

One aspect of the present invention provides a vehicle seat provided with a channel including a channel provided on a lower surface thereof, wherein the vehicle seat includes: a seat part configured to communicate with a seat surface; a back part connected to the seat part; a ventilation flow channel connected to at least the seat part and configured to communicate with the channel; and a blower fan provided at the ventilation flow channel.

Advantageous Effects

Since the vehicle seat according to one embodiment of the present invention has a channel provided on a lower surface of a seat part, the channel is not deformed and a ventilation pathway can be fully maintained even when the passenger sits for a long time.

In addition, the shape of the seat part can be continuously maintained.

In addition, support protrusions can prevent reduction of air flow due to the block of connection flow channels, thereby the performance of the air flowing is improved.

Further, when the channel is formed in a tetragonal shape, even when a shape of the seat is changed based on a vehicle type, a shape of the channel can be equally maintained and a leakage preventing pad can be shared.

Furthermore, even when locations of some connection flow channels formed on the seat are changed, since the support protrusions can reduce the blockage of connection flow channels, the performance of the air flow is improved.

The effects of the present invention are not limited to the above, and other effects will be clearly understood to those skilled in the art from the following description.

DETAILED DESCRIPTION

Hereinafter, a vehicle seat provided with a channel according to the embodiments of the present invention will be described in detail with reference to the accompanying drawings.

Figure 3:
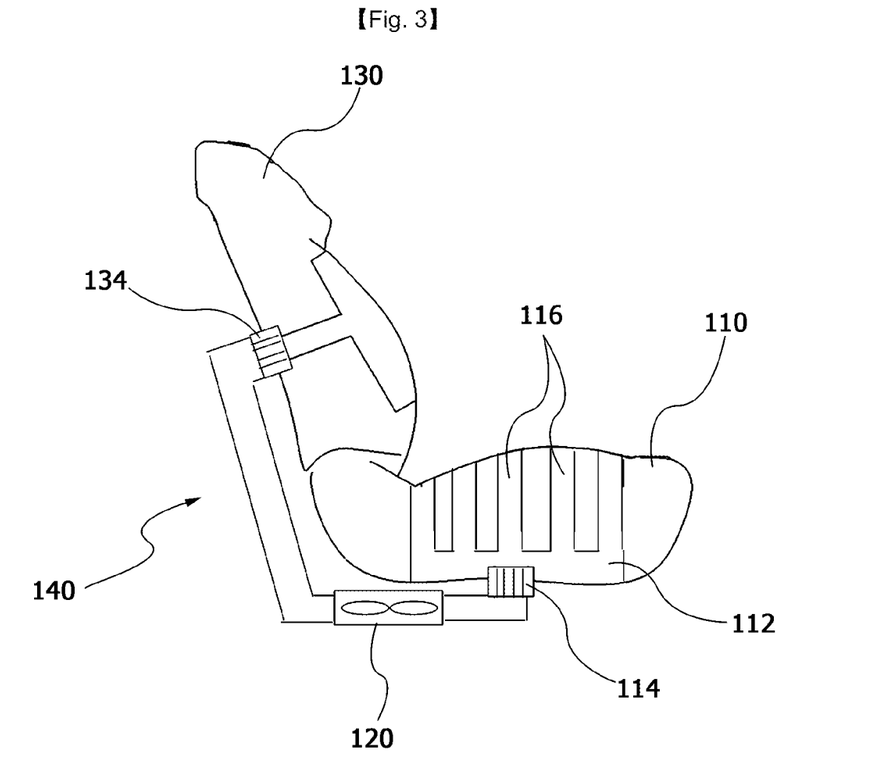
FIG. 3 is a cross-sectional view illustrating an internal structure of a vehicle seat according to a first embodiment of the present invention.

FIG. 3 is a cross-sectional view illustrating an internal structure of a vehicle seat according to a first embodiment of the present invention.

As shown in FIG. 3, the vehicle seat according to the first embodiment of the present invention includes a seat part 110 and a back part 130.

Each of the seat part 110 being in contact with the lower half of the body of a passenger and the back part 130 being in contact with the upper half of the body of the passenger supports the weight of the passenger. Particularly, as an upper surface of the seat part 110 is a seat surface, the body of the passenger is in direct contact with the seat surface.

Figure 4:
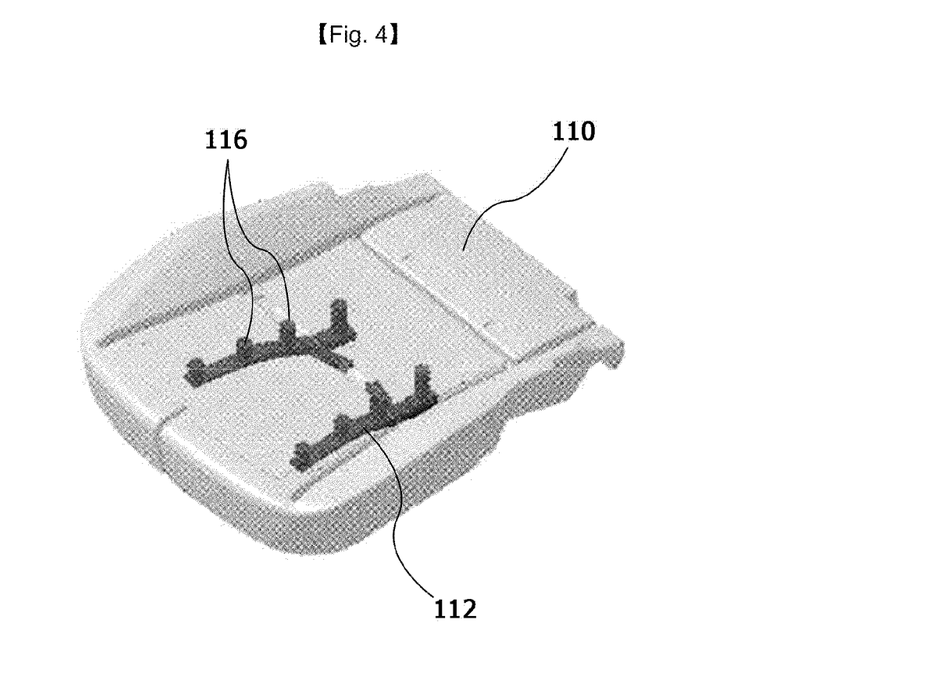
FIG. 4 is a perspective view illustrating a structure of a seat part included in the vehicle seat according to the first embodiment of the present invention.
Figure 8:
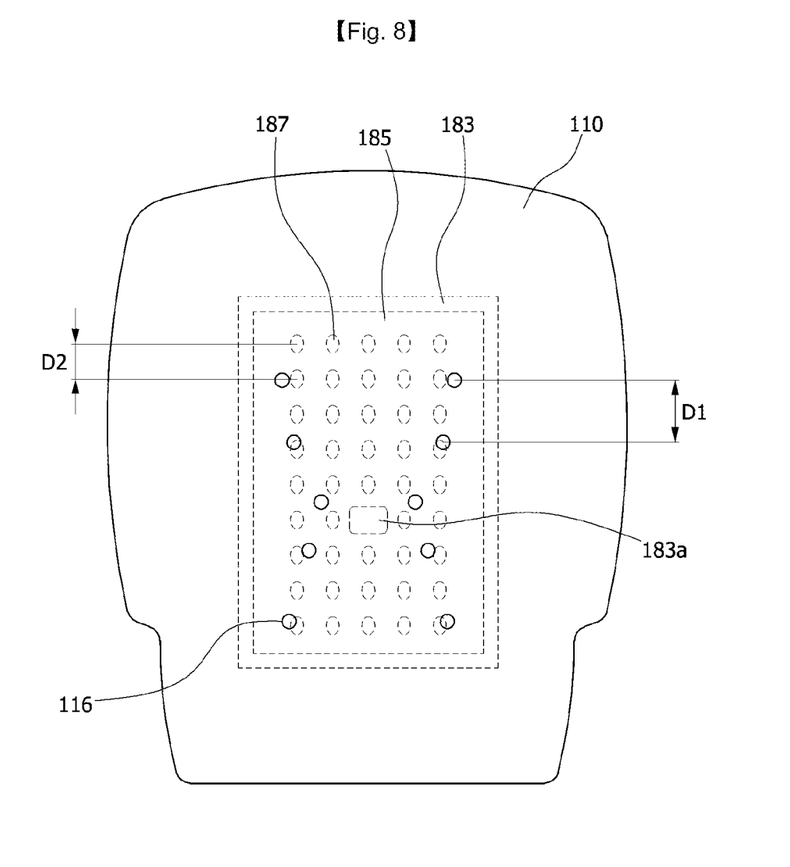
FIG. 8 is a plan view illustrating an internal structure of a vehicle seat according to a third embodiment of the present invention.

Further, a channel 112 is provided on a lower surface of the seat part 110. The channel is connected to a ventilation flow channel 140 to be described below and serves to discharge air to the outside of the seat part 110. The channel 112 may be formed in a shape similar to a general shape of an H-channel as shown in FIG. 4, and also formed to have a cross section in a tetragonal shape as shown in FIG. 8 to be described below.

Here, in a general case, the H-channel is provided on a seat surface which is an upper surface of a seat part, and thus, the H-channel may be easily deformed when a passenger sits for a long time or has a heavy weight. Accordingly, it causes a problem in which a ventilation pathway is deformed and an original function thereof may not be performed. In addition, the hardness of a pad of the seat part is weakened by the H-channel itself, and thus, there is also a problem to drop comfort of the passenger.

However, according to one embodiment of the present invention, since the channel 112 is provided on the lower surface of the seat part 110, the channel is in indirect contact with the body of a passenger, and thus, the channel is not deformed and an overall ventilation pathway thereof is not deformed, either. Therefore, air blowing is possible to smoothly flow toward the passenger.

Further, one or more connection flow channels 116 which communicate the channel 112 with the seat surface may be formed in the seat part 110. Accordingly, air blown from the channel 112 can be effectively discharged.

In the case of the embodiment of the present invention, the plurality of connection flow channels 116 is provided, thereby the weight of the passenger can be easily dispersed and smooth air flowing can be achieved.

Further, a ventilation flow channel 140 is provided at the rear of the seat part 110 and back part 130 of the vehicle seat, and a blower fan 120 is provided at the ventilation flow channel 140. The ventilation flow channel 140 may transfer air blown by the blower fan 120 to at least the seat part 110. That is, the ventilation flow channel 140 is connected to at least the seat part 110, and selectively connected to the back part 130.

In the case of the embodiment of the present invention, the ventilation flow channel 140 is connected to the seat part 110 and also extends to and is connected to the back part 130. Accordingly, air blown by the blower fan 120 can be transferred to both of the seat part 110 and back part 130.

Further, although one blower fan 120 is provided in the embodiment of the present invention, a plurality of blower fans may be provided. That is, the blower fan 120 may include a first blower fan, which blows air toward the seat part 110, and a second blower fan which blows air to the back part 130. In the above case, each blower fan is independently configured, and thus, air flowing can be more smooth.

Meanwhile, one or more positive temperature coefficients (PTCs) may be provided at the ventilation flow channel. As the PTC is a semiconductor device for generating heat according to electrical resistance, which is well-known in the art, the detailed description of the PTC will be omitted.

According to the embodiment of the present invention, the PTCs are totally provided in two places, and specifically, the PCTs include a seat part PTC 114 and a back part PTC 134.

FIG. 4 is a perspective view illustrating a structure of a seat part 110 included in the vehicle seat according to the first embodiment of the present invention.

As shown in FIG. 4, the channel 112 is provided on the lower surface of the seat part 110, and the plurality of connection flow channels 116 are connected along a shape of the channel 112 toward the seat surface. Thus, even when the weight of the passenger is applied to the seat part 110, the channel 112 is not deformed and smooth air flowing can be achieved.

Figure 5:
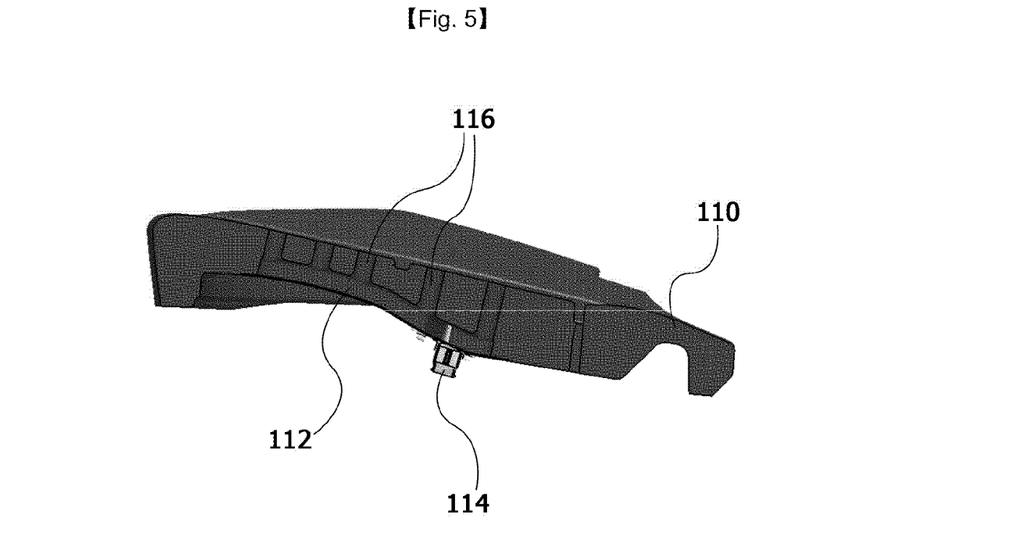
FIG. 5 is a cross-sectional view illustrating the structure of the seat part included in the vehicle seat according to the first embodiment of the present invention.

FIG. 5 is a cross-sectional view illustrating the structure of the seat part 110 included in the vehicle seat according to the first embodiment of the present invention.

FIG. 5 illustrates the structure of the seat part 110 in more detail, and shows that the channel 112 is provided on the lower surface of the seat part 110. Here, the channel 112 is connected to a ventilation flow channel not shown in the drawing, and the PTC 114 is provided in the connection pathway.

Further, the plurality of connection flow channels 116 vertically extends in a shape perpendicular to the channel 112.

As a result, in the vehicle seat according to one embodiment of the present invention, the channel 112 is not deformed even when the passenger sits for a long time, and can fully maintain the ventilation pathway, and in addition, it is more advantageous that the shape of the seat part 110 can be continuously maintained.

Figure 6:
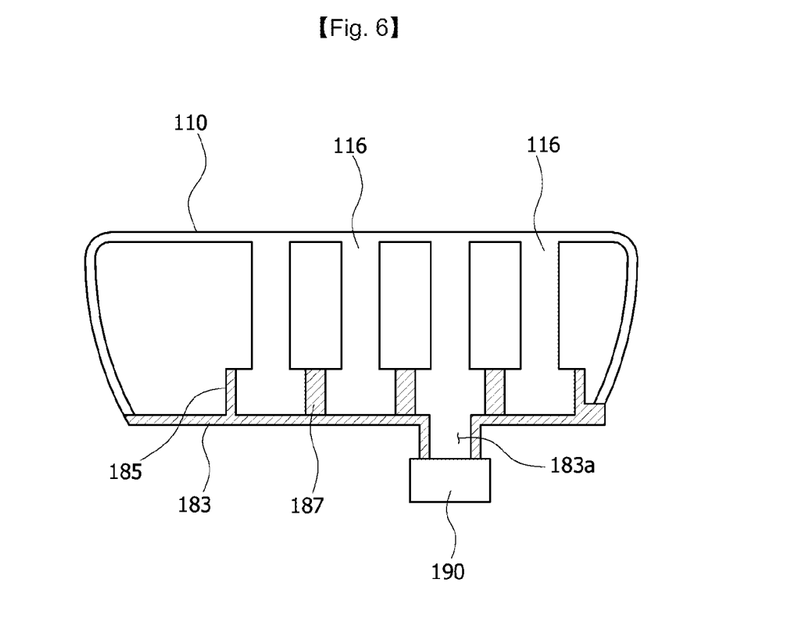
FIG. 6 is a cross-sectional view illustrating an internal structure of a vehicle seat according to a second embodiment of the present invention.
Figure 7:
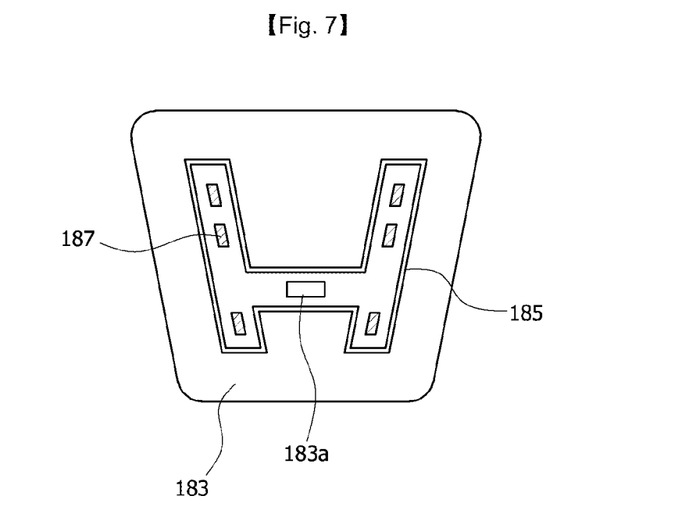
FIG. 7 is a plan view illustrating a part of the vehicle seat shown in FIG. 6.

Referring to FIG. 6, which illustrates a cross-sectional view illustrating an internal structure of a vehicle seat according to a second embodiment of the present invention, and FIG. 7, which illustrates a plan view illustrating a part of the vehicle seat shown in FIG. 6, a leakage preventing pad 183 in which an air inlet 183a is formed is further disposed under the channel 112.

The air inlet 183a is coupled with a temperature adjusting module 190 having a temperature adjusting unit, such as the above-described PTC 114, and the blower fan 120. Accordingly, air passed through the air inlet 183a is not leaked from a lower surface of the seat due to the leakage preventing pad 183 and may be discharged through the connection flow channels 116.

Here, it is preferable that a leakage preventing wall 185 in a shape corresponding to a shape of a cross section of the channel 112 be formed on the leakage preventing pad 183 to surround a lower end portion of the channel 112 so as to prevent air passed through the air inlet 183a from discharging through sides of the seat. Here, when a lower surface of the channel 112 and sidewalls of the extended channel 112 are formed to be insertable into the leakage preventing wall 185, it may be determined whether the assembly of the channel 112 and the leakage preventing wall 185 is correctly assembled or not, and thus, it is preferable that the leakage preventing wall 185 be formed to be slightly greater than the sidewalls of the channel 112.

Furthermore, it is preferable that support protrusions 187 supporting the lower surface of the channel 112 be formed on the leakage preventing pad 183 to prevent from deforming the balance of the overall seat and the channel 112 by the weight of a user when the user uses the seat.

In a vehicle seat according to a third embodiment of the present invention, a channel 112 has a cross section in a tetragonal shape as shown in FIGS. 8 to 11. Connection flow channels 116, which communicate the channel with a seat surface, are formed on a seat part 110. It is preferable that the connection flow channels 116 be arranged along locations at which the H-channel described with the first embodiment of the present invention is formed. In addition, although not shown, the channel 112 may have a structure arranged at regular intervals, and may have a structure arranged along portions being in contact with the body of a user when the user sits on the seat part 110.

Figure 9:
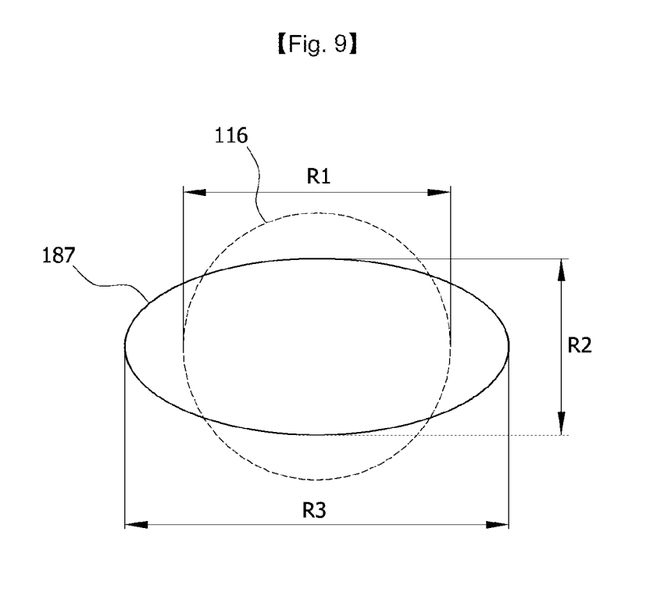
FIG. 9 is an enlarged plan view illustrating a part of support protrusions shown in FIG. 8.

A leakage preventing pad 183 is mounted under the channel 112. The support protrusions 187 protrude from an upper surface of the leakage preventing pad 183 to support a lower surface of the channel 112. It is preferable that the support protrusions 187 have a cross section in an elliptical shape. It is preferable that intervals D2 between the support protrusions 187 be arranged to be smaller than intervals D1 between the connection flow channels 116. It is preferable that the support protrusions 187 be arranged at regular intervals, but may be arranged at irregular intervals. Further, as shown in FIG. 9, it is preferable that the support protrusions 187 be formed in an elliptical shape having a first diameter R3 greater than a diameter R1 of the connection flow channel 116 and a second diameter R2 smaller than the diameter R1. When the support protrusions 187 are formed in the elliptical shape, although the connection flow channels 116 overlap the support protrusions 187 in assembly, air flowing may flow into the connection flow channels 116. Accordingly, to form the support protrusions 187 in an elliptical shape is very important. Further, another configuration, in which the support protrusions 187 may have a cross section in a circular shape, and the connection flow channels 116 may be formed in an elliptical shape, may be formed.

Figure 10:
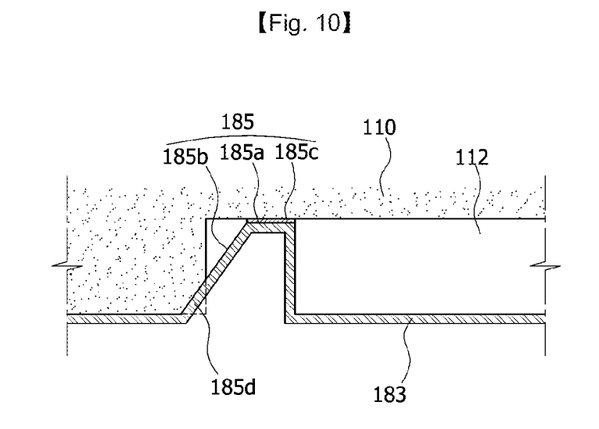
FIG. 10 is a cross-sectional view illustrating a leakage preventing wall shown in FIG. 8.

A leakage preventing wall 185 having a predetermined height protrudes from an upper portion of the leakage preventing pad 183. The protruding height corresponds to a depth of the channel 112. The leakage preventing wall 185 has an adhesive surface 185a being in contact with the lower surface of the channel 112, and an inclined plane 185b being in contact with a sidewall of the channel 112. An adhesive member 185c is mounted on the adhesive surface 185a and attaches the adhesive surface 185a of the leakage preventing pad 183 to the lower surface of the channel 112. The inclined plane 185b is formed to have a greater thickness and to be sloped in a direction toward a sidewall end of the channel 112. A pressure surface 185d, which deforms and presses an end portion of the sidewall, extends to and is formed on an end of the inclined plane 185b.

As shown in FIG. 10, when the leakage preventing pad 183 is mounted, the leakage of air is first prevented by the adhesive member 185c. In addition, the sidewall of the channel 112 is deformed and maintained in a pressed state by the pressure surface 185d disposed on an end of the inclined plane 185b, and thus, the leakage of air is second prevented. Here, the inclined plane 185b is formed to be longer than a length of the sidewall.

Figure 11:
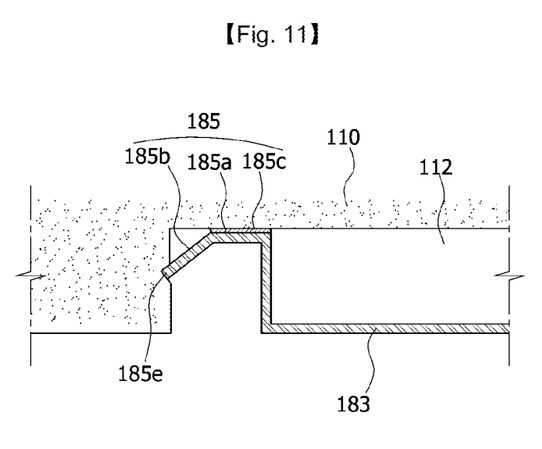
FIG. 11 is a cross-sectional view illustrating another embodiment of the leakage preventing wall shown in FIG. 8.

Similar to the above, as shown in FIG. 11, a leakage preventing wall 185 having a predetermined height protrudes from the upper portion of the leakage preventing pad 183. The protruding height corresponds to a depth of the channel 112. The leakage preventing wall 185 has an adhesive surface 185a being in contact with the lower surface of the channel 112, and an inclined plane 185b being in contact with a sidewall of the channel 112. A fixing part 185e, which presses a middle portion of the sidewall, is formed on an end of the inclined plane 185b. An adhesive member 185c is mounted on the adhesive surface 185a and attaches the adhesive surface 185a of the leakage preventing pad 183 to the lower surface of the channel 112. The inclined plane 185b is formed to have a greater thickness and to be sloped in a direction toward a sidewall end of the channel 112. As shown in FIG. 11, when the leakage preventing pad 183 is mounted, the leakage of air is first prevented by the adhesive member 185c. In addition, a state, in which the fixing part 185e provided on the end of the inclined plane 185b presses and is inserted into a sidewall middle portion of the channel 112, is maintained, and thus, the leakage of air is second prevented. Here, the inclined plane 185b is formed to be shorter than a length of the sidewall.

In the vehicle seat according to the embodiment of the present invention, the channel 112 and the leakage preventing pad 183 may be formed to be located at the back part 130 as well as at the seat part 110. When those are formed in the back part 130, the structure thereof may be formed to be the same as a structure in which those are formed in the seat part 110. Further, a general lumbar plate to be mounted on the back part 130 can be removed and the leakage preventing pad 183 can be replaced to serve as the lumbar plate. The lumbar plate is one of the components of the back part, and is a structure which supports the waist of a seated passenger.

The embodiments described in the present specification and structures described in the accompanying drawings are only preferable examples to explain part of the inventive concept of the present invention. Therefore, as the embodiments of the disclosed present invention are intended not to limit but to explain the inventive concept of the present invention, the scope of the inventive concept of the present invention is not limited to the embodiments. All various modifications and particular embodiments easily conjecturable by those skilled in the art within the spirit and scope of the present invention are understood to be included in the scope of the present invention.

What is claimed is:
1. A vehicle seat, comprising:
 a seat part having a seat surface;
 a channel defined in a lower surface of the seat part;
 a back part connected to the seat part;
 a ventilation flow channel connected to at least the seat part and configured to communicate with the channel;
 a blower fan coupled to the ventilation flow channel; and
 a leakage preventing pad in which an air inlet defined under the channel,
 wherein a support protrusion configured to support a lower surface of the channel is formed on the leakage preventing pad,
 wherein a leakage preventing wall in a shape corresponding to a shape of the channel is formed on the leakage preventing pad,
 wherein the leakage preventing wall includes an adhesive surface being in contact with the lower surface of the channel, and an inclined plane which contacts a sidewall of the channel and is sloped to have an incline.

2. The vehicle seat of claim 1, wherein the ventilation flow channel extends and connects to the back part.

3. The vehicle seat of claim 2, wherein the blower fan is a first blower fan and is configured to blow air toward the seat part, the vehicle seat further comprising a second blower fan configured to blow air toward the back part.

4. The vehicle seat of claim 1, further comprising one or more Positive Temperature Coefficients (PTCs) provided at the ventilation flow channel.

5. The vehicle seat of claim 1, wherein one or more connection flow channels which communicate the channel with the seat surface are defined in the seat part.

6. The vehicle seat of claim 5, wherein intervals between the support protrusions are arranged to be smaller than intervals between the connection flow channels.

7. The vehicle seat of claim 6, wherein the support protrusions are formed in an elliptical shape having a first diameter greater than a diameter of each of the connection flow channels and a second diameter smaller than the diameter of each of the connection flow channels.

8. The vehicle seat of claim 1, wherein the channel is formed as an H-channel.

9. The vehicle seat of claim 1, wherein the channel is formed to have a cross section in a tetragonal shape, and one or more connection flow channels which communicate the channel with the seat surface are defined in the seat part.

10. The vehicle seat of claim 1, wherein an adhesive member is mounted on a surface of an adhesive surface in contact with the channel.

11. The vehicle seat of claim 1, wherein a pressure surface configured to deform and press an end portion of the sidewall extends from and is formed on an end of the inclined plane.

12. The vehicle seat of claim 1, wherein a fixing part configured to press and be fixedly inserted into a middle portion of the sidewall is provided on an end of the inclined plane.

* * * * *